(12) United States Patent
Duces et al.

(10) Patent No.: US 8,136,756 B2
(45) Date of Patent: Mar. 20, 2012

(54) SYSTEM FOR ELECTRICAL GENERATION, CONVERSION, DISTRIBUTION, AND STARTING ON BOARD AN AIRCRAFT

(75) Inventors: Marc Duces, Toulouse (FR); Jean-Louis Lando, Saverdun (FR); Etienne Foch, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 367 days.

(21) Appl. No.: 12/445,944

(22) PCT Filed: Oct. 25, 2007

(86) PCT No.: PCT/EP2007/061475
§ 371 (c)(1),
(2), (4) Date: Apr. 17, 2009

(87) PCT Pub. No.: WO2008/049886
PCT Pub. Date: May 2, 2008

(65) Prior Publication Data
US 2010/0193630 A1 Aug. 5, 2010

(30) Foreign Application Priority Data
Oct. 27, 2006 (FR) ...................................... 06 54589

(51) Int. Cl.
*B64D 41/00* (2006.01)

(52) U.S. Cl. ...................................................... 244/58

(58) Field of Classification Search .................... 244/58, 244/199.1, 201, 203, 204, 205, 207; 318/148; 307/9.1, 32; 361/62; 123/179.1
See application file for complete search history.

(56) References Cited

U.S. PATENT DOCUMENTS

| 5,233,286 | A | 8/1993 | Rozman et al. |
|---|---|---|---|
| 5,297,015 | A | 3/1994 | Miyazaki et al. |
| 6,807,076 | B1 | 10/2004 | York |
| 2006/0044722 | A1* | 3/2006 | Wavering et al. ............... 361/62 |
| 2006/0061213 | A1 | 3/2006 | Michalko |
| 2006/0152949 | A1 | 7/2006 | Cester |

FOREIGN PATENT DOCUMENTS

| EP | 0 409 226 | 1/1991 |
|---|---|---|
| EP | 1 679 784 | 7/2006 |
| FR | 2 882 200 | 8/2006 |
| WO | 2004 037641 | 5/2004 |

OTHER PUBLICATIONS

Graig Pearen, Brushless Alternators, 2000.*
"Automated Power-Distribution System", National Aeronautics and Space Administration, Marshal Space Flight Center, p. 128, XP 000224742, (1991).
Niggemann, R. E. et al., "270-VDC/Hybrid 115-VAC Electric Power Generating System Technology Demonstrator", Aerospace and Electronic Conference, Proceedings of the IEEE 1991 National Dayton, pp. 448-454, XP010048147, (1991).

* cited by examiner

*Primary Examiner* — Timothy D Collins
*Assistant Examiner* — Nicholas McFall
(74) *Attorney, Agent, or Firm* — Oblon, Spivak, McClelland, Maier & Neustadt, L.L.P.

(57) ABSTRACT

A system for electrical generation, conversion, distribution and starting on board an aircraft, of "bleedless" type, that is, with an electrical power architecture with no pneumatic circuits. The electrical distribution channels for high power loads specific to aircraft of "bleedless" type, and the electrical distribution channels for conventional loads, including technical loads, such as avionics, lighting, fuel pumps and commercial loads are separated, and are supplied with power by separate generators driven by the aircraft's engines.

29 Claims, 6 Drawing Sheets

Background Art

SYSTEM FOR ELECTRICAL GENERATION, CONVERSION, DISTRIBUTION, AND STARTING ON BOARD AN AIRCRAFT

TECHNICAL FIELD

The invention concerns an electrical generation, conversion, distribution and starting system on board an aircraft.

The aircraft concerned is advantageously one in which non-propulsion systems are principally supplied using electrical power, such an aircraft being referred to as "bleedless", that is, it has an electrical power architecture which has no pneumatic circuits.

In the remainder of the description, for reasons of simplicity, an aircraft of the "bleedless" type will be considered as an example.

THE EXISTING STATE OF THE TECHNIQUE

Non-propulsion systems of existing designs of aircraft are powered by three circuits which take power off the jet engines: a hydraulic power circuit, an electrical power circuit and a pneumatic power circuit.

The hydraulic power is mainly used to supply power to the primary and secondary flight control actuators, the landing gear extension and retraction systems, the front wheel guidance system and braking systems.

Electrical power is mainly used to supply technical loads such as the avionics, lighting, fuel pumps and various fans, and commercial loads such as catering services (kitchen areas or "galleys") and passenger entertainment systems.

Pneumatic power is mainly used to supply the cabin air pressurisation and conditioning system, the wing and engine nacelle ice protection systems and for starting the engines.

Recently, new architectures for non-propulsion systems which require a greater use of electrical power have appeared in the context of research projects or pre-project design studies. Thus:

a hydraulic circuit and the servo-control systems associated with it may be replaced by electrical actuators.

The engine air off-take powering the air conditioning units ("packs") and wing de-icing systems may be omitted and replaced by a more powerful electricity generation system.

In the latter case the architecture is referred to as "bleedless". There is a description comparing this with conventional aircraft architecture in the document [1] referred to at the end of the description. As shown in FIG. 1, this "bleedless" architecture involves, in particular, the following equipment:

two starter-generators SG-B1 and SG-B2, driven by the same engine Eng-1, each of which supplies a busbar AC-B1 or AC-B2 with a three-phase 230 volt AC power supply whose frequency is variable between 360 and 800 Hz, these busbars AC-B1 and AC-B2, which distribute the power from the starter-generators directly to the balanced three-phase loads supplied with a 230 volt AC power supply, for example the heating resistances for preventing ice forming at the leading edge of the wings, represented by the two half-moons WIPS-B1 and WIPS-B2, an auto-transformer ATU-B2, which converts the 230 volts AC to 115 volts AC to supply power to three-phase or single-phase 115 volt loads, usually of lower power than the 230 volt loads, through a busbar AC-2, auto-transformer-rectifier units ATRU-B1 and ATRU-B2, which convert the three-phase 230 volts AC from busbars AC-B1 and AC-B2 into a two-phase +/−270 volt DC supply to busbars DC-B1 and DC-B2, inverters MCU-B1 and MCU-B2 connected to the +/−270 volts high DC voltage, which power and control the voltage and current of electrical motor compressor units CAC-1 and CAC-2 of the air conditioning system ECS1, in order to regulate their speed and torque, a transformer-rectifier TRU-B which converts the three-phase 230 volts AC to single-phase volts DC which supplies power to the low power avionics via the busbar DC-B, a battery charger BC-B and a battery B, connected to a busbar HOT-B which is permanently supplied with power by the battery.

In FIG. 1, as well as in the subsequent figures, the components referred to, for example, SC-B1, SC-B2 . . . are contactors which allow connections to be made or broken between the various components defined above.

Schematically the main electricity generation system for this existing design of system is based, in the case of a twin-engine aircraft as shown in FIG. 2, on four distribution channels B1, B2, Y1 and Y2 which combine the electrical loads referred to as "conventional" with the new so-called "power" electrical loads which are specific to "bleedless" aircraft. This generation system uses the components in the architecture shown in FIG. 1, together with other components which serve the same purpose as these components and which are referred to in an analogous manner. This figure also shows two starter-generators ASG-B and ASG-Y driven by the auxiliary power unit APU-GT. These two auxiliary starter-generators can supply power to busbars AC-B1, AC-B2, AC-Y1 and AC-Y2 when the main starter-generators are unavailable. An emergency back-up generator Emer-G powered by an air-driven turbine (RAT or "Ram Air Turbine") can supply power in the event of a loss of the main generation system, to the busbar AC-EMER, with a transformer-rectifier TRU-E being installed between this busbar AC-EMER and a DC busbar DC-E.

In FIG. 2, the inputs EP-B, EP-B2, EP-Y1 and EP-Y are ground connections for connecting external electrical power units on the ground.

This existing electrical generation, conversion and distribution system below is referred to as "4M" where M stands for "Mixed", referring to the four channels B1, B2, Y1 and Y2 which mix the power loads and conventional loads.

The major drawback of the architecture of this existing "4M" system is the need for heavy electrical equipment, mainly due to the constraints on the quality of the electrical power set by the aeronautical standards or indeed by the aircraft manufacturers' directives.

Thus the current constraints for low levels of harmonic rejection require, for example, in order to carry out the conversion of the three-phase 230 V AC into +/−270 DC, the use of a so-called "ATRU" auto-transformer-rectifier, made up of an auto-transformer with a phase angle difference of 40 degrees, as described in the document in reference [2], and an eighteen-diode rectifier bridge, as described in the document in reference [3].

Furthermore, current constraints require that large passive filtering components be used, such as inductances and condensers, at the inputs to and outputs from electrical equipment such as the generators, electronic power converters, inverters and the electrical loads. Such filtering components are required in order to ensure that the harmonics generated by the power loads (air conditioning etc.) do not interfere with the conventional loads.

In addition, the electric circuit for such a "4M" architecture, whose principal voltage is 230 volts AC, requires conversion of the power supplied by external ground units, currently 115 volts AC. Existing solutions offer specific conversion through auto-transformers between the 230 volt AC and 115 volt AC busbars or through the windings of the internal "ATRU" rectifier auto-transformer.

Thus the expansion of the electrical systems in new aircraft require that the architecture of the electricity circuits be redefined, since the existing 115 volts AC and 28V DC voltages are no longer appropriate for the power requirements. A logical approach would be to increase the voltages and use rectifiers and inverters to drive and control the rotation of the electric motors. However, the architecture corresponding to such a solution gives rise to significant weight penalties for the aircraft.

The purpose of the invention therefore is to propose a design of architecture which is lighter, due to the separation of loads which produce harmonic pollution from loads which require high quality voltage.

PRESENTATION OF THE INVENTION

The invention concerns a system for electrical generation, conversion, distribution and starting on board an aircraft, for example an aeroplane, of the "bleedless" type; that is, which has an electrical power architecture with no pneumatic circuits, characterised by the fact that the electrical distribution channels for high power loads specific to aircraft of the "bleedless" type, and the electrical distribution channels for conventional loads, including technical loads, such as avionics, lighting, fuel pumps and commercial loads are separated, and are supplied with power by separate generators driven by the aircraft engines.

In advantageous modes of construction this system includes:
   at least two first electrical distribution channels for high power loads, and
   at least two second electrical distribution channels for conventional loads.

Each first channel is advantageously a three-phase 115 volt or 230 volt AC system. The frequency may be between 360 Hz and 800 Hz, or between 800 Hz and 2000 Hz.

The frequency for the power channel is advantageously between 800 Hz and 2 kHz and the frequency for the conventional channels is between 360 Hz and 800 Hz.

Each generator for such a first channel is advantageously a poly-phase machine with a number of phases which is equal to or greater then three; preferably equal to five or six. Each first channel includes one or two poly-phase rectifier bridges with six or more diodes to change the three-phase 230 volts AC to +/−270 volts DC.

The generators may advantageously all be identical. Each generator is a brushless three-phase synchronous generator, reversible or otherwise, which supplies 115 volts or 230 volts AC at a frequency between 360 Hz and 800 Hz.

In a first example of a construction option ("2P2C" architecture) the system in the invention includes:
   two electrical distribution channels for high power loads,
   two electrical distribution channels for conventional loads.

Each electrical distribution channel for high power loads includes:
   an electrical starter-generator,
   two simple six-diode rectifier bridges with reduced filtering,
   two first DC busbars,
   two reduced filtering inverters,
   a transformer-rectifier,
   a second DC busbar,
   a battery.

Each electrical distribution channel for conventional loads includes:
   an electrical starter-generator,
   a first AC busbar,
   a converter,
   a second AC busbar.

This system advantageously includes:
   a first master box which brings together two first power channels,
   a second master box which brings together two second power channels,
   a third master box which brings together conventional channels at 230 volts and 115 volts AC, and 28 volt DC circuits and
   an emergency back-up master box.

In a second example of a construction option ("4P2C" architecture) the system in the invention includes:
   four electrical distribution channels for high power loads,
   two electrical distribution channels for conventional loads.

It includes six identical starter-generators and two auto-transformers.

It advantageously includes:
   a first master box which brings together two first power channels,
   a second master box which brings together two second power channels,
   a third master box which brings together the conventional channels at 230 volts and 115 volts AC, and the 28 volt DC circuits and
   an emergency back-up master box.

It advantageously includes a crossover between starter-generators and corresponding master boxes at different positions in the fuselage.

In a third example of a construction option ("4P*2C" architecture), the system in the invention includes:
   four optimised electrical distribution channels for high power loads,
   two electrical distribution channels for conventional loads.

It advantageously includes four power starter-generators dedicated to the optimised power channels and two conventional generators. The principal stage of the starter-generators advantageously includes a poly-phase synchronous alternator with a number of phases which is equal to or greater then three, in particular cases of five or six phases, where this principal stage may also be made up of two 30° three-phase systems The conventional generators may be brushless three-phase three-stage synchronous machines. A variable frequency range is used which is between 800 and 2000 Hz for optimised electrical distribution channels for high power loads.

This system advantageously includes:
   a first master box which brings together two power channels, a DC busbar and a three-phase inverter,
   a second master box which brings together two power channels, a DC busbar and a three-phase inverter,
   a first half-panel which brings together technical busbars for 115 volts AC and commercial busbars,
   a second half-panel which brings together technical busbars for 115 volts AC and commercial busbars,
   a third half-panel which brings together busbars, power converters and a transformer-rectifier,
   a fourth half-panel which brings together busbars, power converters and a transformer-rectifier, In comparison with existing systems, the system in the invention offers the following advantageous characteristics:

an electrical power generation and conversion architecture which separates, into distinct distribution channels, the loads which generate harmonic pollution and loads which require high quality voltage, an electrical power generation and conversion architecture which improves reliability, safety and availability by means of a greater number of principal sources of electrical power in order to obtain improved segregation of distribution channels and increased redundancy, the segregation and reconfiguration of the electrical generation, starting, conversion and distribution system into three separate "blue", "green" and "yellow" electrical circuits, each broken down into two sub-circuits, with the first being supplied with power by a first engine and the second sub-circuit being supplied with power by a second engine, an electrical generation and conversion architecture which ensures technological dissimilarity of principal electrical power sources for improved security of supply of power for critical loads.

the use of higher frequency electrical starter-generators to improve power/weight ratios and reduce volumes in comparison with existing electrical generators (IDGs (or "Integrated Driven Generators"), VSCFs (or "Variable Speed Constant Frequency"), VFGs (or "Variable Frequency Generators"), VFSGs (or "Variable Frequency Starter Generators")), a reduction of the mass of the starter-generator for each power channel, as a result of the relaxation in design constraints relating to the circuit voltage quality, a reduction in mass of the filtering components associated with the power electronic inverters and rectifiers, due to the separation of the "power channel" with polluting power electronics from the "conventional channel" with loads which require high quality electrical power, a reduction in the mass of filtering components associated with the power electronics inverters and rectifiers due to a higher frequency range for the voltage generated by the higher speed starter-generators, the use of simple, light, rectifier bridges with reduced filtering instead of heavy and complex ATRUs ("Auto-Transformer-Rectifier-Units"), an increase in the power/weight ratios of electrical generators driven by the auxiliary power unit due to the use of a higher speed of rotation, the use of starter-generators made up of poly-phase synchronous machines with more than three phases in a viable aircraft architecture.

BRIEF DESCRIPTION OF THE DIAGRAMS

DETAILED DESCRIPTION OF SPECIFIC CONSTRUCTION OPTIONS

The electrical generation, conversion, distribution and starting system on board an aircraft, as in the invention uses separate electrical distribution channels for power loads on the one hand and conventional loads on the other. These separate channels are supplied with power by separate generators driven by the aircraft's engines. A given engine may, however, drive several generators.

In comparison with the existing "4M" architecture described above, the separation of loads which generate harmonic pollution and loads which require high quality voltage into separate electrical distribution channels means that the filtering constraints imposed by the conventional loads in power channels, already present in existing aircraft, can be overcome.

This system is, in the case of a twin-engine aircraft, made up of one or more electrical distribution channels for high power loads called "P", one or more electrical distribution channels for conventional loads called "C", Thus examples of construction options for a such a new architecture are from now on called, according to the number of power channels and conventional channels, "2P2C", "4P2C", and "4P*2C".

The system in the invention allows the overall mass of the electrical system and the number of items of electrical equipment in an aircraft to be reduced, namely principal and auxiliary starter-generators, static electric power converters, rectifiers, inverters and transformers, by reducing their associated filtering components.

Various modes of construction of the system in the invention and the equipment used will be analysed below. These construction options relate to:

a power channel architecture,
a generation system for the power channel,
converters for the power channel, and
a conventional channel.

Which of these construction options is selected will depend on the advantages that it is hoped to gain.

All the following observations are made for the case involving the principal generation unit, that is, driven by the engines, but they are also valid for the auxiliary generation unit driven by an auxiliary power unit (APU) of the turbine engine or fuel cell type, or for the emergency back-up generation unit, of the air-driven turbine, battery or fuel cell type.

1. Architecture of the Power Channel

Figure 3:
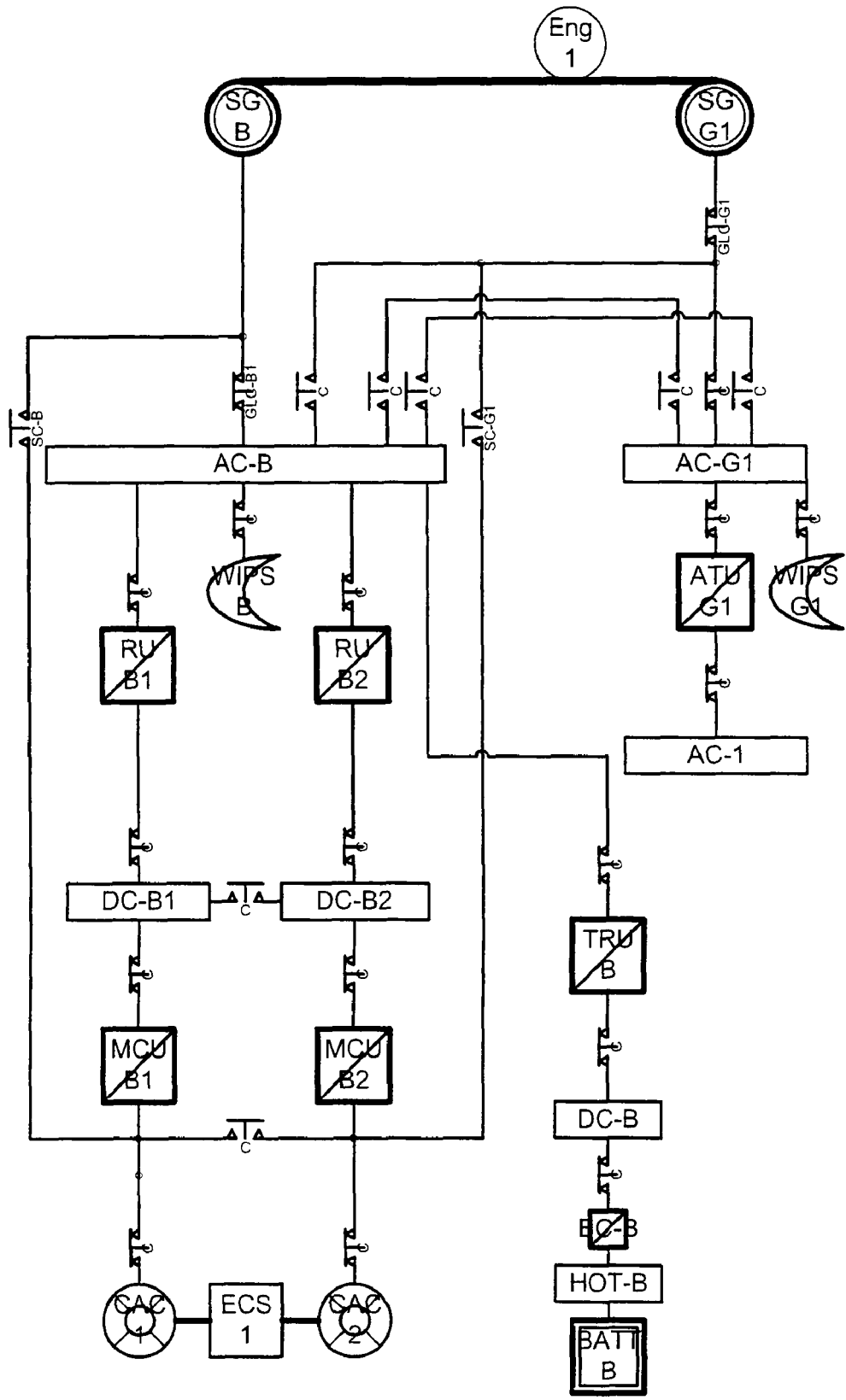
FIG. 3 shows a schematic representation of an electrical power circuit associated with an engine, which is in accordance with a first construction option for the architecture of the invention.

As shown in FIG. 3, in a power channel, for reasons associated with maintenance costs and in order to minimise the number of electrical generators, a single starter-generator SG-B supplies power, through a main AC power supply bus AC-B, to all power loads, represented by a wing ice-protection system WIPS-B and two power supply chains with rectifiers RU-B1 and RU-B2 and two inverters MCU-B1 and MCU-B2 for the motor compressor units CAC1 and CAC2 of the air conditioning system ECS1.

Figure 5:
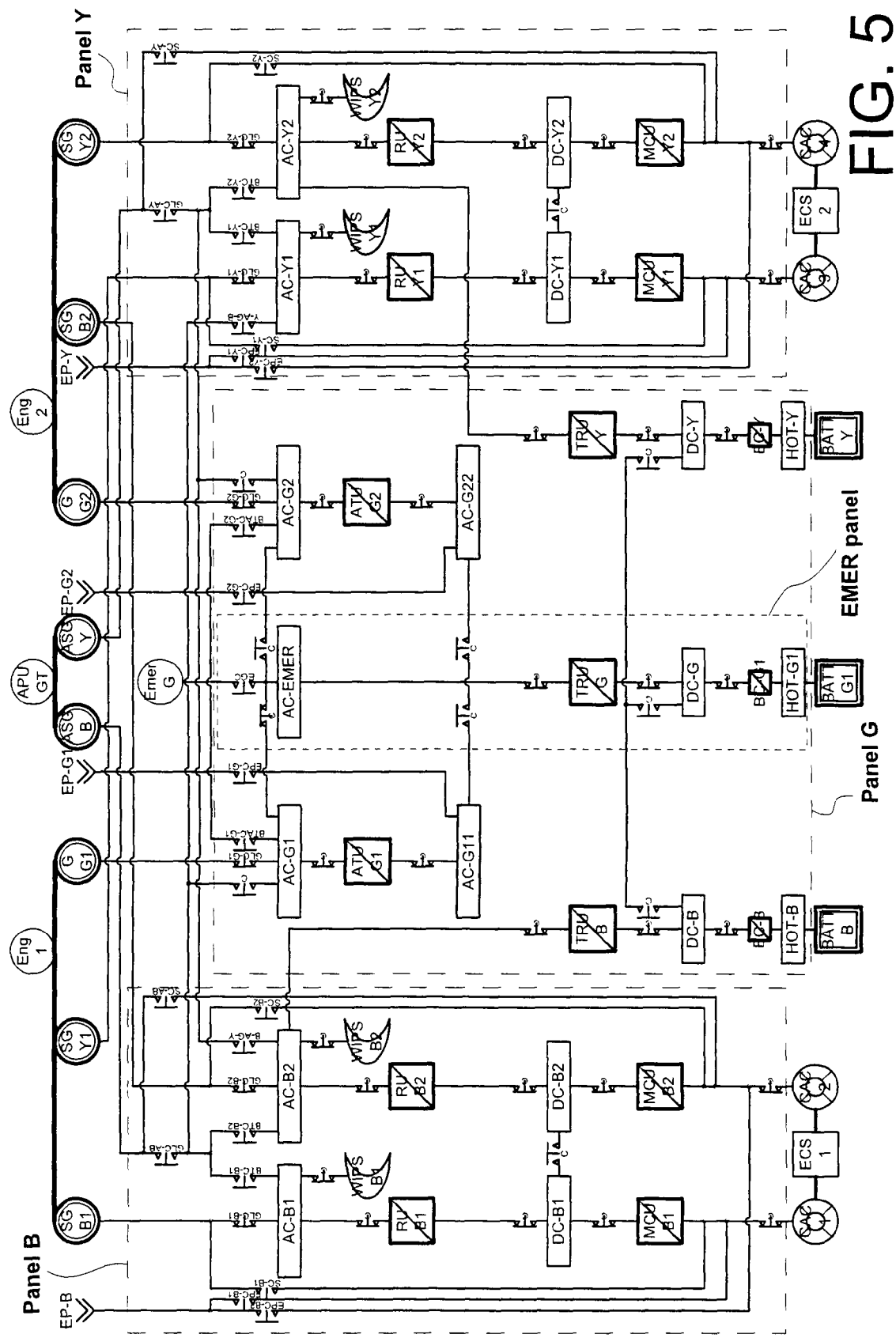
FIG. 5 shows a schematic representation of a second example of a construction option for the architecture of the invention: "4P2C" architecture
Figure 6:
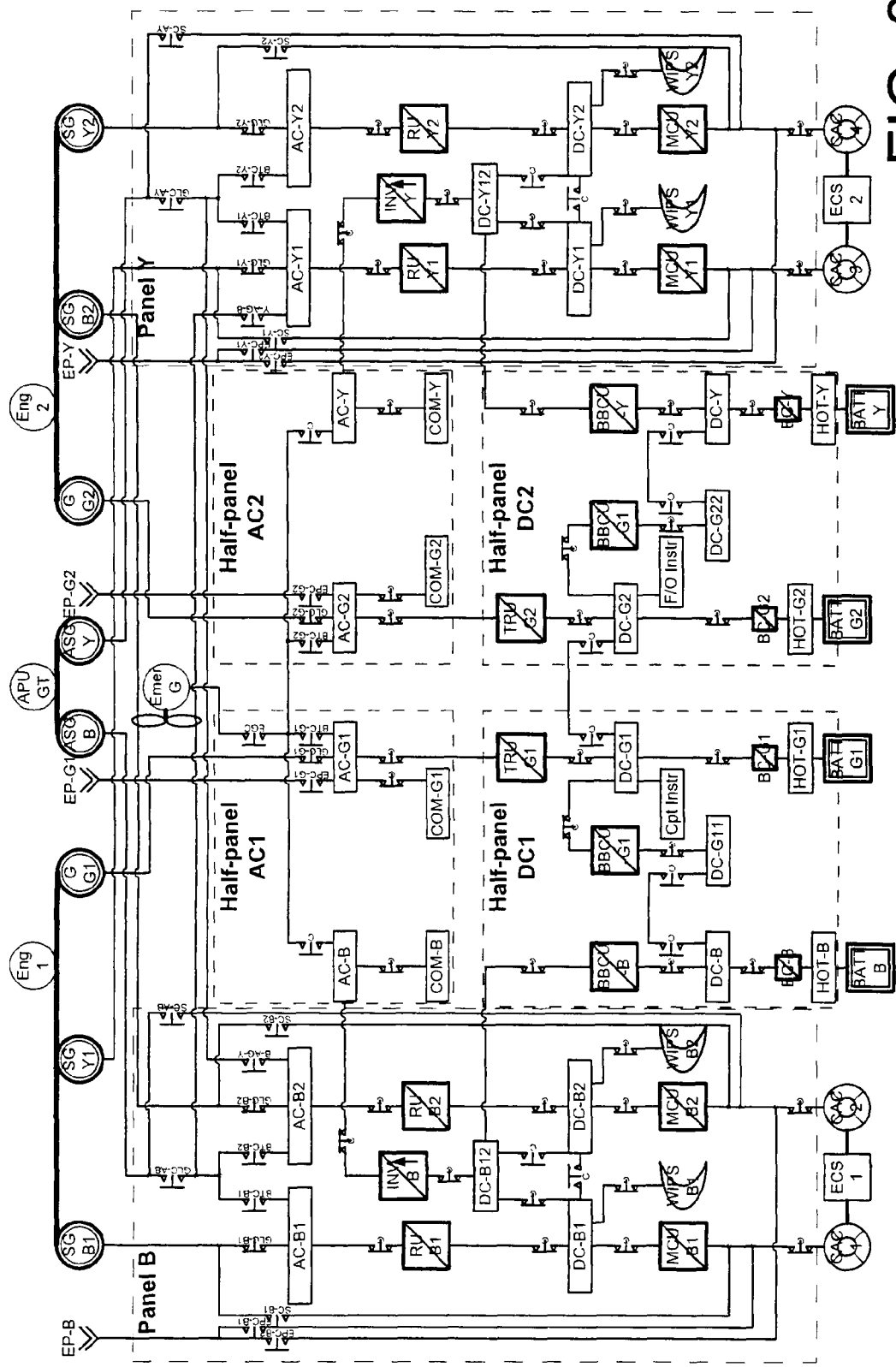
FIG. 6 shows a schematic representation of a third example of a construction option for the architecture of the invention: "4P*2C" architecture

In another construction option as illustrated in FIGS. 5 and 6, in order to prevent under-use of the conventional channel generators in the case when they are of an identical size as the power channel generators, two generators are used to supply power to two separate power channels. Such a division of the generation system into several generation sub-systems means that the diameter of each of the generators can be reduced. The result of this is that:

- the overall diameter of the engine pod, and therefore aerodynamic drag, can be reduced,
- the number of sources of electrical power is increased, allowing increased redundancy and enhanced segregation of the electrical circuits,
- the reliability and security of the electrical power supply to user systems is enhanced, as well as the operational reliability and availability of the aircraft,
- the coupling of this electrical generation architecture to a flight control architecture using electrical actuators is facilitated as a result of the increase in the number of electrical power sources.

2. Generation System for the Power Channel

In order to retain the option of interconnection with a conventional channel, each power channel is a three-phase AC system, with or without distributed neutral, as 115 V or 230 volts, so as to prevent excessive mass of wiring, depending on the power needs of the user systems, with a constant frequency equal to 400 Hz or a variable frequency of between 360 and 800 Hz.

In order to reduce the mass of the starter-generators for a given power, an increase in the electrical frequency may be achieved:

- by increasing the speed of rotation, or
- by increasing the number of pairs of poles, or
- by combining these two solutions.

The frequency may therefore vary between 800 and 2000 Hz, which corresponds to a frequency for an 8-pole starter-generator running at between 12000 and 30000 rpm. Such an increase in the frequency means that the number and therefore the weight of filtering components for static electronic converters for each power channel can be reduced.

A relaxation of the power channel voltage quality constraints is possible: it allows the power/weight ratio of the starter-generators to be increased by focussing on geometric and weight-based design, without having to take internal electrical parameter constraints into consideration.

In order to increase its power/weight and power/volume ratios and in order to optimise its rectification structure, each generator for a power channel is advantageously constructed using a poly-phase machine with a number of phases which is equal to or greater than three, and preferably equal to five or six.

3. Converters for the Power Channel

The conversion-rectification function turning the three-phase 230 volts AC primary voltage into +/−270 volts DC, necessary in an electric speed variator, is advantageously achieved using a light and simple six-diode three-phase rectifier bridge in the case of "2P2C" and "4P2C" architectures, whereas a heavy and complex eighteen-diode auto-transformer rectifier and inter-phase inductances are necessary in a "4M" architecture in order to meet the conventional circuit quality standards.

In the case of a poly-phase generation unit with a number of phases which is greater than three, as envisaged above, a poly-phase rectifier without auto-transformer reduces the ripple of its output voltage and rejects fewer upstream harmonics on the circuit.

If, as envisaged above, there is a relaxation of the voltage quality in the power channels, the static electronic power converter filters, inverters or choppers connected to the power channels may be reduced to a minimum. This reduction in the filters, which is independent of the reduction in the number of filtering components envisaged above, may be combined with the latter.

4. Conventional Channel

All generators supplying power to the power channels or supplying power to the conventional channels may advantageously be identical, for reasons associated with maintenance costs, and in order to retain interchangability with each other. These generators may then be brushless three-stage three-phase synchronous generators called VFGs ("Variable Frequency Generators"), or such generators rendered reversible so that they may carry out the electrical engine starting function, called VFSGs ("Variable Frequency Starter Generators"). A generator which provides three-phase 115 volts AC at a constant frequency of 400 Hz or with a frequency which varies between 360 and 800 Hz means that the 230 volts AC/115 volts AC conversion function typically carried out using a dedicated auto-transformer can be done away with.

But two different types of generators may also be used for the power channels and conventional channels in order to ensure technological dissimilarity between the principal sources of electrical power, thus maintaining improved security of power supply to critical loads.

Three examples of construction options for the systems in the invention will now be described, called "2P2C", "4P2C" and "4P*2C", in which a selection from the various construction options above is made. These construction options are described in order of increasing complexity, that is, in order of introduction of increasingly complex modifications.

A. First Example of a Construction Option

2P2C Architecture

This "2P2C" architecture is, in the case of a twin-engine aircraft, made up of:

- two electrical distribution channels for high power loads, called "P",
- two electrical distribution channels for conventional loads, called "C".

Figure 4:
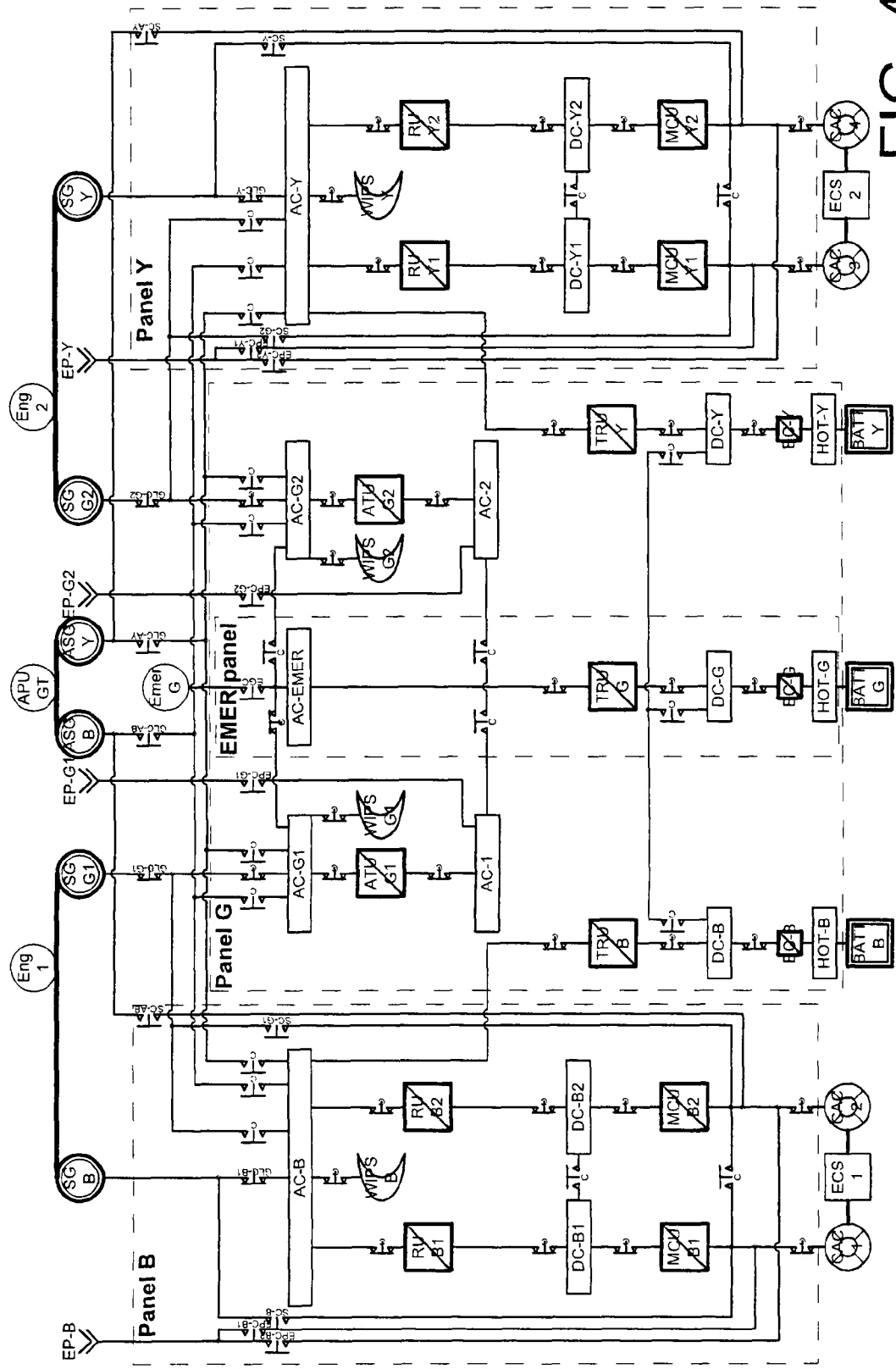
FIG. 4 shows a schematic representation of this first example of a construction option for the "2P2C" architecture of the invention.

FIG. 4 therefore shows representations of four identical starter-generators SG-B, SG-G1, SG-G2 and SG-Y, four simple rectifiers RU-B1, RU-B2, RU-Y1 and RU-Y2, four inverters MCU-B1, MCU-B2, MCU-Y1 and MCU-Y2 with reduced filtering, two auto-transformers ATU-G1 and ATU-G2 and three transformer-rectifiers TRU-B, TRU-Y and TRU-G.

According to FIG. 3, the electrical power taken from an aircraft engine Eng1 or Eng2 is distributed through channels "P" and channels "C".

A "P" electrical distribution channel B (or Y) in particular includes:

- an electric starter-generator SG-B (SG-Y)
- a primary busbar, preferably 230 volts AC, AC-B (AC-Y), which directly distributes the power from the starter-generator SG-B (SG-Y) to a balanced three-phase load WIPS-B (WIPS-Y),
- two simple six-diode rectifier bridges with reduced filtering RU-B1 and RU-B2 ((RU-Y1 and RU-Y2),
- two busbars, preferably +/−270 volts DC, DC-B1 and DC-B2 (DC-Y1 and DC-Y2),
- two inverters with reduced filtering MCU-B1 and MCU-B2 (MCU-Y1 and MCU-Y2) which control the speed and torque of the high power motors or starter-generators in starter mode, two motor compressor units CAC-1 and CAC-2 (CAC-3 and CAC-4) for the air conditioning system ECS 1 (ECS-2), a transformer-rectifier TRU-B (TRU-Y), a busbar DC-B (DC-Y), a battery charger BC-B (BC-Y), a battery BATT-B (BATT-Y).

A "C" electrical distribution channel, G1 (or G2), in particular includes:

an electric starter-generator SG-G1 (SG-G2)

a primary busbar, preferably 230 volts AC, AC-G1 (AC-G2), which directly distributes the power from the starter-generator SG-G1 (SG-G2) to a balanced three-phase load WIPS-G1 (WIPS-G2), a 230 volts AC/115 volts AC converter ATU-G1 (ATU-G2), if necessary, a busbar for 115 volts AC, AC-1 (AC-2).

As shown in FIG. 4 the system in the invention associated with this architecture advantageously includes:

a "blue" master box (or electrical panel) or "Panel B", which brings together the power half-channels B1 and B2, a "yellow" master box or "Panel Y", which brings together the power half-channels Y1 and Y2, a "green" master box or "Panel G", which brings together the conventional channels G1 and G2 at 230 volts and 115 volts AC, and the 28 volt DC circuits DC-B and DC-Y, and an emergency back-up master box or "EMER Panel", which includes the emergency back-up conventional channel.

Each of these circuits includes components which are analogous to those illustrated in FIG. 3, and which were described previously.

In all the figures, the states of the contactors referred to, for example C, GLC, EPC, EGC, BTC, SIC, and SC, open or closed, correspond to a flight configuration under normal conditions.

In the architecture illustrated in FIG. 3, when in flight or on the ground, the engines Eng1 or Eng2 have been started and are in normal configuration (no equipment faults); engine Eng-1 mechanically drives the electric starter generator SG-B. This generator SG-B supplies power to the "power" channel electrical loads connected to the busbars AC-B, DC-B1 and DC-B2.

The aircraft engine Eng-1 also mechanically drives the electric starter-generator SG-G1. This generator SG-G1 supplies power to the electrical loads of the "conventional channel" connected to the busbars AC-G1.

Electric starter-generators SG-B and SG-G1 are identical items of equipment in order to retain interchangability, to enable the circuit to be reconfigured and to access the busbars in abnormal conditions. On the other hand, their connections to the electrical circuit and their respective functions in the "2P2C" architecture are different.

Such starter-generators may be brushless three-stage reversible three-phase synchronous machines, which can be used in generator mode or in starter mode. Given the increased power requirements in future aircraft, a line-to-neutral output voltage from these starter-generators is selected, which has an rms value of 230 volts, instead of the 115 volts widely used in aeronautic applications, with the frequency of the circuit being variable between 360 and 800 Hz and proportional to the speed of the high pressure (HP) shaft of the engine Eng-1.

A "C" electrical distribution channel supplies power to AC loads which require high quality voltage electrical supply. Thus technical loads and commercial loads are connected to the busbars AC-G1.

Loads which are non-polluting from the harmonic rejection point of view and which tolerate low quality voltages, such as a system of heating resistance elements which provide wing ice protection WIPS-B or WIPS-G1 may supplied with power by either the "conventional" or "power" channel", such a choice of power being made so as to ensure a balanced sizing of generators SG-B and SG-G1.

Low DC voltage loads such as avionics, as shown in FIG. 4, are connected to busbars DC-B, DC-G and DC-Y and may be supplied with power, depending on the circuit configuration, by transformer-rectifiers TRU-B, TRU-G and TRU-Y or batteries BATT-B, BATT-G and BATT-Y though battery chargers BC-B, BC-G and BC-Y.

Figure 1:
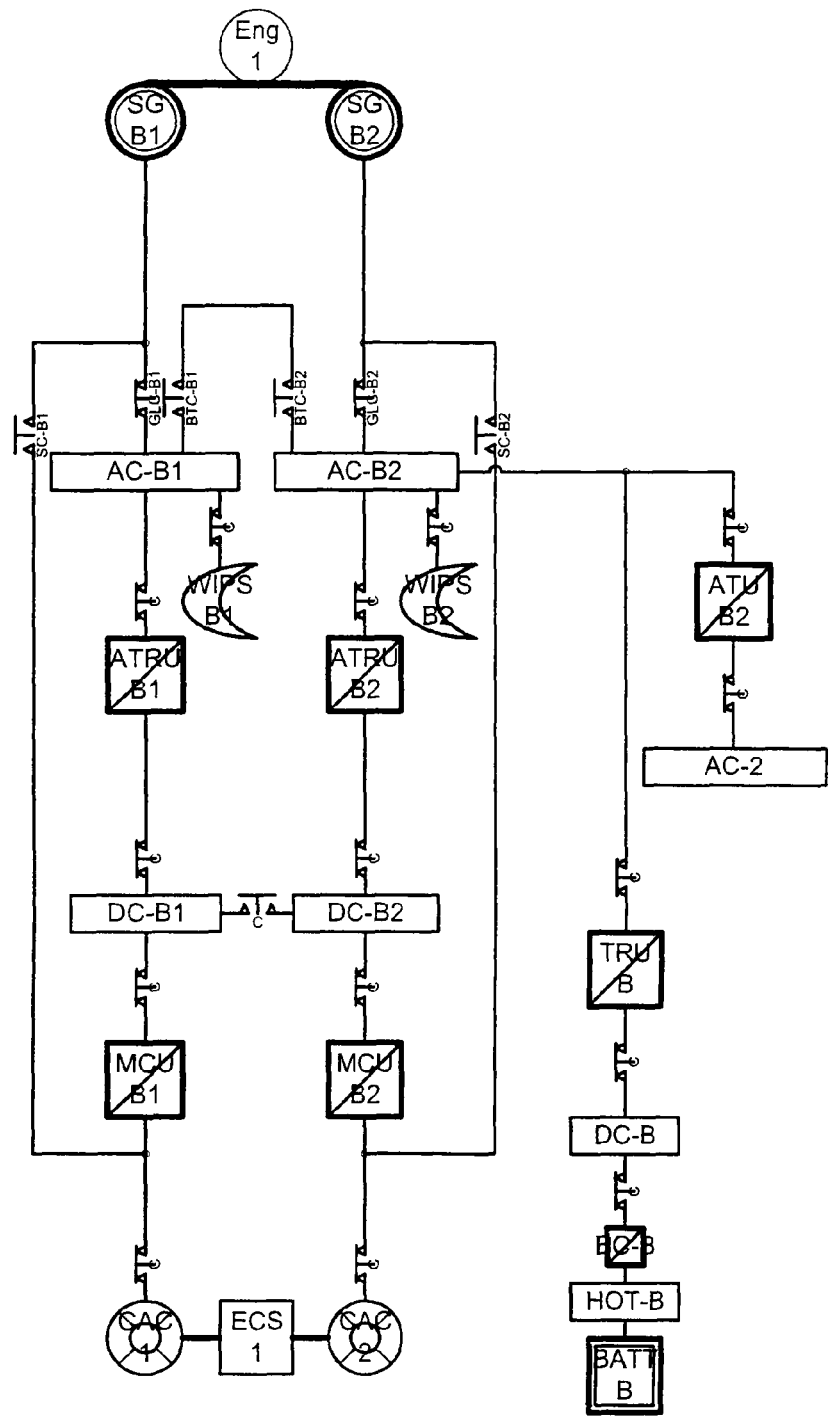
FIG. 1 shows a schematic representation of an electrical power circuit associated with an engine which conforms to an existing "4M" architecture.
Figure 2:
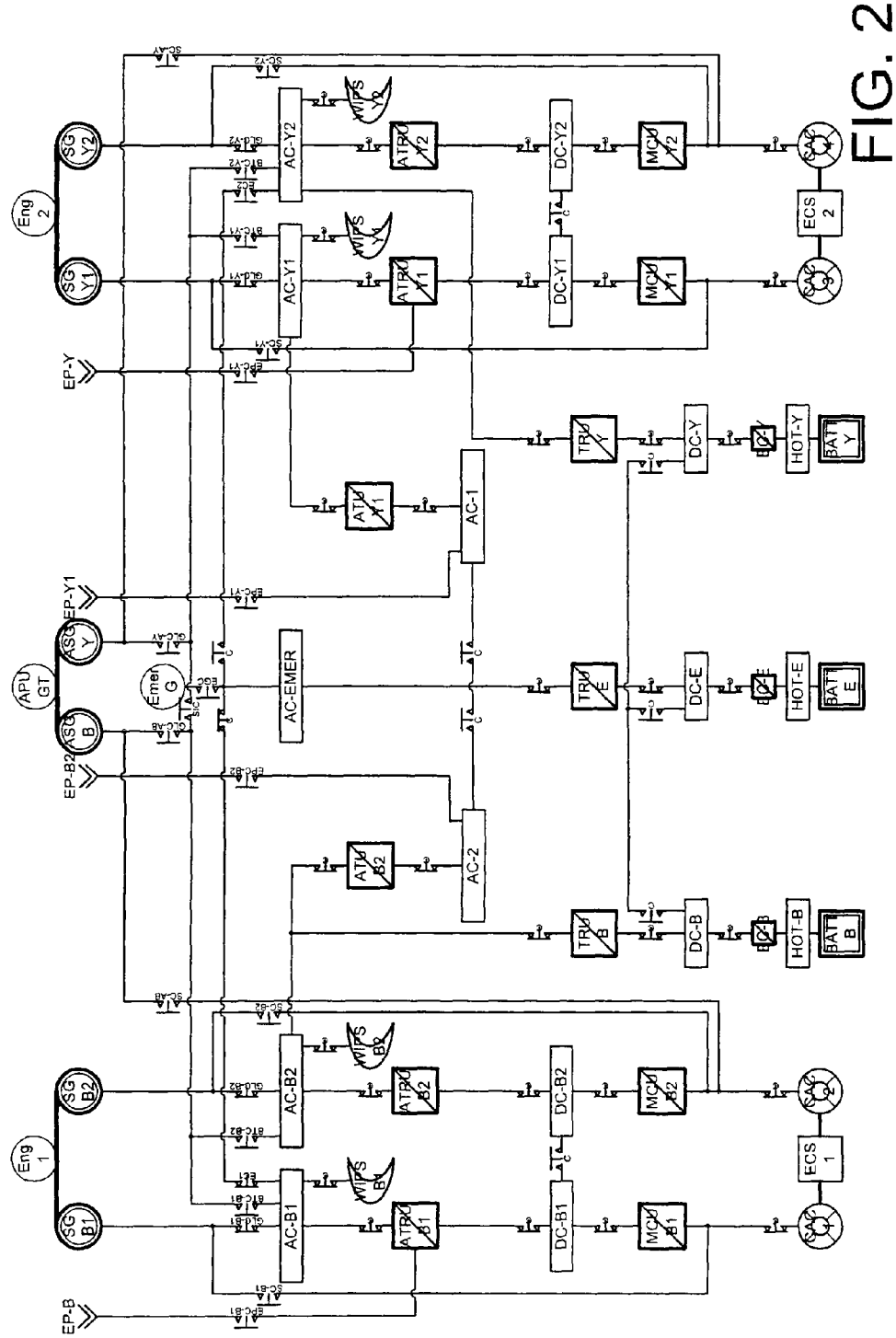
FIG. 2 shows a schematic representation of an electrical generation, conversion, distribution and starting system which is in accordance with an existing "4M" architecture.

The power channel associated, in normal mode, with the starter-generator SG-B supplies power to the six-diode three-phase rectifiers RU-B1 and RU-B2 which convert the three-phase AC voltage of the bus AC-B into a rectified DC voltage which is distributed through busbars DC-B1 and DC-B2. As explained above, a light six-diode rectifier RU-B1 is sufficient in comparison with the heavy eighteen-diode auto-transformer-rectifier ATRU-B1 shown in FIGS. 1 and 2, even though the six-diode rectifier rejects many harmonics, since the so-called "power" channel loads can accept a voltage quality which is much lower in comparison with current standards.

The busbars DC-B1 and DC-B2 supply power to the three-phase inverters MCU-B1 and MCU-B2, which supply power to motor compressor units CAC1 and CAC2 of the air-conditioning system ECS1 and regulate their speed, torque and power by modifying current and voltage actions according to the requirements of the aircraft's air-conditioning system ECS1.

The separation of loads which generate harmonic pollution and loads which require high quality voltage into separate distribution channels means that the filtering components associated with the inverters MCU-B1 and MCU-B2 can be greatly reduced, thus reducing the mass of such items of equipment.

In the example of the construction option shown in FIG. 4, when the aircraft is on the ground the starter-generators SG-B and SG-G1 are used in starter mode to mechanically drive the engine Eng-1 during the start-up sequence. Then engine Eng-2 is started using the starter generators SG-G2 and SG-Y. The sources of power for the electric starting of the engines may be the auxiliary power unit APU-GT, or one or more ground units EP-B, EP-G1, EP-G2, EP-Y or the other engine Eng-1 or Eng-2 if it has already been started.

Inverters MCU-B1 and MCU-B2, in addition to their functions of controlling the motor compressor units CAC1 and CAC2, may also be used to supply power and control the starter-generators SG-B and SG-G1 in the start-up mode for engine Eng-1. During a start-up when power is supplied on the ground through ground points EP-B and EP-G1, one of the inverters, for example MCU-B1, may also be used in three-phase rectifier mode to convert the 115 volts AC supplied by the ground unit connected to point EP-B to a direct current for busbars DC-B1 and DC-B2. The other inverter MCU-B2 provides the power supply and control for the starter-generator SG-G1.

B. Second Example of a Construction Option

4P2C Architecture

"4P2C" architecture is, in the case of a twin-engine aircraft, made up of:
- four electrical distribution channels for high power loads, called "P",
- two electrical distribution channels for conventional loads, called "C".

As shown in FIG. 5, this example of a construction option includes four identical power starter-generators SG-B1, SG-Y1, SG-B2 and SG-Y2 and two conventional generators G-G1 and G-G2. It includes, as already shown in FIG. 4: four simple rectifiers RU-B1, RU-B2, RU-Y1, RU-Y2, four reduced filtering inverters MCU-B1, MCU-B2, MCU-Y1, MCU-Y2 and two auto-transformers ATU-G1 and ATU-G2.

The advantages listed for the "2P2C" architecture are also valid for the "4P2C" architecture.

In such an example each heavily loaded "P" channel is divided into two channels "B1" and "B2" (or "Y1" and "Y2"). Such a division allows, in comparison with the "2P2C" architecture, improved sizing of the power starter-generators and a reduction in mass in terms of the aircraft to be achieved.

In order to retain interchangability of the starter-generators and to reduce the cost of maintenance and storage of replacement parts, the six starter generators SG-B1, SG-Y1, G-G1, G-G2, SG-B2, SG-Y2 (six per aircraft, that is three per engine Eng1 and Eng2 for a twin jet), which each supply power to a busbar AC-B1, AC-Y1, AC-G1, AC-G2, AC-B2, AC-Y2 are identical machines, although their functions or associated distribution systems may be quite different. There are therefore six identical starter-generators (even though the starter function is not used for both generators associated with the conventional channels) and two auto-transformers ATU-G1 and ATU-G2.

The "4P2C" architecture increases the reliability and security of the electrical power supply and the availability and operational reliability of the aircraft because of the greater number of sources of electrical power. In addition it ensures better segregation of the distribution channels and increased redundancy of the electrical power supply system.

Thus the inclusion of a "more electrical" or "fully electrical" flight control architecture, coupled to such a "4P2C" power architecture is facilitated.

As shown in FIG. 5, flight control architecture called "3H" based on three hydraulic circuits identified by three different colours, blue, green and yellow, is used to identify the six electrical channels present in the case of the "4P2C" architecture installed in a twin-engine aircraft. On the left hand side of FIG. 5, the first channel is identified as "B1" and the second channel is called "B2"; and it is possible to reconfigure these two "blue" channels between each other. The two central green channels are labelled "G1" and "G2". To the right the two yellow channels are labelled "Y1" and "Y2".

As shown in FIG. 5 the electrical master boxes associated with this "4P2C" architecture make up:
- a "blue" master box or "Panel B" which brings together power channels B1 and B2,
- a "yellow master box" or "Panel Y" which brings together the power channels Y1 and Y2,
- a "green master box" or "Panel G" which brings together the conventional channels G1 and G2 at 230 volts and 115 volts AC, and brings together the 28 volt DC circuits DC-B and DC-Y,
- an "emergency back-up" master box or "EMER Panel" which includes the emergency back-up conventional channel.

The operation of the "4P2C" architecture is very similar to that of the "2P2C" architecture. The slight differences are easily understood by a comparative analysis of FIGS. 4 and 5.

However, one particular advantage of the "4P2C" architecture is the incorporation of a specific crossover between corresponding starter-generators and master boxes in different positions in the aircraft fuselage, for example the left and right hand sides (called "Panel B" and "Panel Y" or "side 1" and "side 2") in order to avoid excessive reconfigurations and transfers between busbars in the event of an engine stopping. The starter-generator SG-Y1 driven by engine Eng1 supplies power to the electrical master box "Panel Y". The starter-generator SG-B2 driven by engine Eng2 supplies power to the electrical master box "Panel B". Thus, in the event of the engine Eng2 stopping, for example, the following configuration could occur with no transfer between electrical master boxes:
- The electrical master box "Panel B" is still supplied with power by the starter-generator SG-B1.
- The electrical master box "Panel G" is still supplied with power by generator G-G1.
- The electrical master box "Panel Y" is still supplied with power by starter-generator SG-Y1.

C. Third Example of a Construction Option

4P*2C Architecture

"4P*2C" architecture is, in the case of a twin-engine aircraft, made up of:
- four electrical distribution channels optimised for high power loads shown as "P*", that is, which include complex modifications,
- two electrical distribution channels for conventional loads, shown as "C".

The advantages listed for the "4P2C" architecture apply for the "4P*2C" architecture except for the point relating to total interchangability between the six starter-generators, an advantage that does not exist with "4P*2C" architecture, but which is compensated for by the fact that the 230 volts AC/115 volts AC converter is not needed.

As shown in FIG. 6, this 4P*2C architecture includes four power starter-generators SG-B1, SG-Y1, SG-B2 and SG-Y2 and two conventional starter-generators G-G1 and G-G2, but no auto-transformer. It introduces technological dissimilarity between a power starter-generator and a conventional generator, a dissimilarity whose benefits are assessed in the safety analysis.

The sizing constraints of the power starter-generator relating to the voltage quality of the circuit are relaxed, so that its mass may be reduced.

Furthermore, in comparison with the "4P2C" architecture, a very high rotation speed and/or an optimised number of power starter-generator poles are used. This allows:
- a reduction in its mass and its diameter,
- a higher electrical frequency range, allowing the mass of the rectifier filters and inverters to be reduced even further in comparison with the "4P2C" architecture.

The reduction in the mass of the principal starter-generators, driven by the engines, which can result through increasing the speed of rotation of the rotor and/or relaxing the constraints on the quality of the electrical power in the circuit, can also be applied to the auxiliary starter-generators driven by the auxiliary power unit (APU).

The four principal starter generators SG-B1, SG-Y1, SG-B2, SG-Y2 dedicated to the optimised power channels "P*" are electrical machines which are specifically designed to supply power to the power channels and are completely free of the design constraints on current aeronautical generators.

In order to reduce the mass of the starter-generators for a given power, the speed of rotation and number of pairs of poles may be increased without the need to keep the variable frequency between 360 and 800 Hz, for example between 800 and 2000 Hz, which corresponds to the frequency of a starter-generator with eight poles rotating at between 12000 and 30000 rpm.

Furthermore, the relaxation of constraints on the voltage quality in "P*" channels means that the power/weight ratio of starter-generators can be increased by focussing on the geometric and mass design without having to take constraints on internal electrical parameters into consideration.

The principal stage of starter-generators SG-B1, SG-Y1, SG-B2, and SG-Y2 of the "P*" channels are, advantageously, poly-phase synchronous alternators: three-phase, five-phase, six-phase or with two three-phase systems with a phase angle difference of 30° so as to allow parallel power supplies to be made to two simple three-phase rectifier bridges each with six diodes. These machines, which could be called poly-phase machines, mean that in order to guarantee a minimum circuit voltage quality, there is no need for a phase-delay auto-transformer for the rectification operation between the 230 volts AC and +/−270 volts DC.

Both generators G-G1 and G-G2 of the conventional channels "C" are three-stage brushless three-phase synchronous machines which preferably supply a 115 volt AC voltage at the point of regulation, allowing the removal of the 230 volts AC/115 volts AC converter required in "2P2C" and "4P2C" architectures.

The "4P*2C" architecture allows the number and mass of the filtering components associated with the electronic power converters to be reduced, that is, the rectifiers and inverters for the high power loads. Thus the conversion operation for the circuit primary three-phase 230 volts AC voltage to +/−270 volts DC bus required in an electrical speed variator may be achieved using a simple and light poly-phase rectifier bridge with six- or more diodes.

In addition, the use of a higher variable frequency range for "P*" channels, for example 800 to 2000 Hz, means that the mass of the filtering components associated with these channels can be reduced even further.

As shown in FIG. 6 the electrical master boxes associated with this "4P*2C" architecture include:
a "Panel B" master box which brings together the power channels B1 and B2, a DC busbar DC-B12 and a three-phase inverter, INV-B,
a "Panel Y" master box which brings together the power channels Y1 and Y2, a DC busbar DC-Y12 and a three phase inverter, INV-Y,
a first half-panel AC1 which brings together the technical busbars at 115 AC volts AC-B and AC-G1, and commercial busbars COM-B and COM-G1,
a second half-panel AC2 which brings together the technical busbars at 115 AC volts AC-G2 and AC-Y, and commercial busbars COM-G2 and COM-Y,
A third half-panel DC1, which brings together the busbars DC-B, DC-G11 and DC-G1, power converters BBCU-B, BBCU-G1, a transformer rectifier TRU-G1, which can be connected to the pilot-in-command's instruments ("Cpt Instr"),
A fourth half-panel DC2, which brings together the busbars DC-G2, DC-Y and DC-G22, power converters BBCU-G1, BBCU-Y, a transformer rectifier TRU-G2, which can be connected to the co-pilot's instruments ("F/O Instr"), In comparison with the breakdown of electrical panels proposed in the second example of construction options "4P2C", this third example of construction options "4P*2C" is based on identical two-by-two master boxes and avoids the need for a conventional emergency back-up "EMER-Panel" master box whose make-up is different to that of the principal conventional master box Panel G.

In FIG. 6, once, in flight or on the ground, the engines are started and in normal configuration (no equipment faults), the aircraft engine Eng-1 mechanically drives the electrical starter-generators SG-B1 and SG-Y1. The starter-generator SG-B1 supplies power to the electrical loads of the "power" channel B1 connected to the internal busbars AC-B1 and DC-B1 of the "Panel B" electrical master box. The starter-generator SG-Y1 is connected to the electrical master box "Panel Y".

The starter-generator SG-B2 supplies power to the electrical loads of so-called "power" channel B2 connected respectively to the busbars AC-B2 and DC-B2.

The starter-generators SG-B1 and SG-B2 are identical items of equipment in order to allow reconfiguration of the internal circuits of channels B1 and B2 and to access busbars in abnormal conditions.

A "power" starter-generator is then a brushless, three-stage, reversible poly-phase synchronous machine, which can be used in generator mode or in starter mode. Given the increasing power requirements for future aircraft, the phase-to-neutral output voltage from these starter-generators preferably has an rms value of 230 volts instead of the 115 volts widely used in aeronautic applications. The frequency of the power channels is variable between 800 and 2000 Hz and proportional to the speed of the high pressure shaft of the engine Eng-1.

The engine Eng-1 also mechanically drives the electric generator G-G1. The three-phase stator of the principal stage of the generator G-G1 supplies power as three-phase 115 volts AC to the electrical loads of the "conventional" channel connected to the busbars AC-G1. The "conventional" channel supplies power to AC loads which require a high quality voltage electrical supply. Thus technical loads and commercial loads are connected to the busbars AC-G1.

Loads which are non-polluting from the harmonic rejection point of view and which tolerate low quality voltages, such as a system of heating resistance elements which provide wing ice protection WIPS-B1 or WIPS-B2 may supplied with power either by busbars AC-B1, AC-B2 or DC-B1, DC-B2. The selection of such a power supply is made so as to balance the sizing of generators SG-B1 and SG-G1 and rectifiers RU-B1 and RU-B2.

The low voltage 28 volts DC loads, such as avionics, are connected to the busbars DC-G1 and may be supplied with power, depending on the circuit configuration, by the transformer-rectifier TRU-G1 or the battery BATT-G1 through the battery charger BC-G1 The technology and sizing of this 28 volts DC battery known as the "energy battery" are selected so as to ensure that power is supplied in emergency back-up mode.

The power channel B1, associated in normal mode with the starter-generator SG-B1, supplies power to a six-phase twelve-diode rectifier RU-B1 which converts the six-phase AC voltage at the busbar AC-B1 into a rectified DC voltage distributed by means of busbars DC-B1 and DC-B. As explained above, a light 12-diode rectifier is sufficient, even though it rejects more harmonics than the auto-transformer ATRU, since the loads on the "power" channel accept a voltage quality which is low in comparison with current standards.

The busbars DC-B1 and DC-B2 supply power to the six-phase inverters MCU-B1 and MCU-B2 which supply power to motor compressor units CAC1 and CAC2 of the air-conditioning system ECS1 and regulate their speed, torque and power by modifying current and voltage actions according to the requirements of the aircraft's air-conditioning system.

The busbar DC-B and its symmetric component busbar DC-Y, supply power to the electrical flight control actuators which are not shown. The three-phase inverter INV-B converts the DC high voltage +/−270 at the busbar DC-B to three-phase 115 volts AC at a constant frequency of 400 Hz to supply power to the technical loads on the busbar AC-B or commercial loads on the busbar COM-B.

Reversible chopper-type electronic power converters BBCU-B and BBCU-G1 are used to supply medium voltage DC power, via busbars DC-B and DC-G1, to intermittent power actuators such as the electrical braking system. When the normal power supply through the busbar DC-B12 is not available, these actuators may be supplied with power by the battery BATT-B. The technology and sizing of this battery, the so-called "power battery" are selected so as to ensure a power supply for the high but brief demand peaks for intermittent power. In the event of loss of normal power supply through the busbar DC-B12, the converter BBCU-G1 and the bar DC-G1 are used to re-charge the battery BATT-B Just as for the twelve-diode rectifiers used instead of the eighteen-diode auto-transformer rectifier, the separation of loads which generate harmonic pollution and loads which require high quality voltage into separate distribution channels means that the filtering components associated with the inverters MCU-B1 and MCU-B2 can be greatly reduced, thus reducing the mass of such items of equipment.

In FIG. 6, when the aircraft is on the ground the starter-generators SG-B1 and SG-Y1 are used in starter mode to mechanically drive the engine Eng-1 during the start-up sequence. Then engine Eng-2 is started using starter-generators SG-B2 and SG-Y2. The sources of power for the electric starting of the engines may be the auxiliary power unit APU-GT, or one or more ground units EP-B, EP-Y or the other engine Eng-1 or Eng-2 if it has already been started.

Inverters MCU-B1 and MCU-B2, in addition to their functions of controlling the motor compressor units CAC, may also be used to supply power and control the starter-generators SG-B1 and SG-Y1 in the start-up mode for engine Eng-1. During a start-up supplied on the ground through ground points EP-B and EP-Y, certain of the inverters, for example MCU-B2 and MCU-Y2, may also be used in three-phase rectifier mode to convert the 115 volts AC supplied by the ground units connected to points EP-B and EP-Y into a DC voltage for busbars DC-B1/DC-B2 and DC-Y1/DC-Y2. The other inverters MCU-B1 and MCU-Y1 provide the power supply and control for starter-generators SG-B1 and SG-Y1.

---

REFERENCES

[1] US 2004 129835
[2] FR 2 870 039
[3] FR 2 875 971

---

The invention claimed is:

1. A system for electrical generation, conversion, distribution and starting on board an aircraft, of "bleedless" type with an electrical power architecture with no pneumatic circuits, comprising:
   first electrical distribution channels that supply high power loads specific to aircraft of the "bleedless" type including at least one of a motor compressor and an air conditioning system; and
   second electrical distribution channels that supply other loads including at least one of a technical load, avionics, lighting, a fuel pump, and a commercial load, wherein
   the first and second electrical distribution channels are separated, operate in parallel, and supplied with power by separate generators of an engine of the aircraft in a configuration under normal conditions.

2. The system according to claim 1, comprising:
   at least two engines;
   at least two first electrical distribution channels for high power loads; and
   at least two second electrical distribution channels for other loads.

3. The system according to claim 1, wherein each first electrical distribution channel is a three-phase 115 volt or 230 volt AC system.

4. The system according to claim 3, wherein a frequency of the first electrical distribution channels is between 360 and 800 Hz.

5. The system according to claim 3, wherein a frequency of the first electrical distribution channels is between 800 and 2000 Hz.

6. The system according to claim 3, wherein a frequency of the first electrical distribution channels is between 800 Hz and 2 KHz, and a frequency of the second electrical distribution channels is between 360 Hz and 800 Hz.

7. The system according to claim 2, wherein each generator that powers the first electrical distribution channels is a poly-phase machine having a number of phases equal to or greater than three.

8. The system according to claim 7, wherein the number of phases is equal to five or six.

9. The system according to claim 1, wherein each first electrical distribution channel includes one or two poly-phase rectifier bridges with six or more diodes to change the three-phase 230 volts AC to +/−270 volts DC.

10. The system according to claim 1, wherein all the generators are identical.

11. The system according to claim 10, wherein each generator is a brushless three-phase synchronous generator that is reversible.

12. The system according to claim 11, wherein each generator is a generator that supplies 115 volts or 230 volts AC with a frequency between 360 Hz and 800 Hz.

13. The system according to claim 10, comprising:
   at least two engines;
   two first electrical distribution channels for high power loads; and
   two second electrical distribution channels for other loads.

14. The system according to claim 13, wherein each first electrical distribution channel for high power loads includes:
   an electric starter-generator,
   an AC busbar,
   two simple six-diode rectifier bridges with reduced filtering,
   two DC busbars,
   two reduced filtering inverters,
   a transformer-rectifier,
   a busbar, and
   a battery.

15. The system according to claim 13, wherein each second electrical distribution channel for other loads includes:
- an electric starter-generator,
- an AC busbar,
- a converter, and
- an AC busbar.

16. The system according to claim 13, further comprising:
- a first master box that brings together two first power channels,
- a second master box that brings together two second power channels,
- a third master box that brings together the second electrical distribution channels at 230 volts and 115 volts AC, and 28 volt DC circuits, and
- an emergency back-up master box.

17. The system according to claim 1, comprising:
- at least two engines;
- four first electrical distribution channels for high power loads; and
- two second electrical distribution channels for other loads.

18. The system according to claim 17, comprising six identical starter-generators.

19. The system according to claim 17, further comprising:
- a first master box that brings together two of the first electrical distribution channels,
- a second master box that brings together two of the first electrical distribution channels,
- a third master box that brings together the second electrical distribution channels at 230 volts and 115 volts AC, and the 28 volt DC circuits, and
- an emergency back-up master box.

20. The system according to claim 17, further comprising a crossover between starter-generators and corresponding master boxes at different positions in a fuselage of the aircraft.

21. The system according to claim 1, comprising:
- at least two engines;
- four optimized first electrical distribution channels for high power loads; and
- two second electrical distribution channels for other loads.

22. The system according to claim 21, further comprising four power starter-generators dedicated to the optimized first electrical distribution channels and two conventional generators.

23. The system according to claim 22, wherein a principal stage of the starter-generators includes a poly-phase synchronous alternator: three-phase, five-phase, six-phase or with two three-phase systems with a phase angle difference of 30°.

24. The system according to claim 22, wherein the conventional generators are three-stage brushless three-phase synchronous machines.

25. The system according to claim 22, wherein the first electrical distribution channels operate in a variable frequency range that is between 800 and 2000 Hz.

26. The system according to claim 21, further comprising:
- a first master box that brings together two of the first electrical distribution channels, a DC busbar, and a three phase inverter,
- a second master box that brings together two of the first electrical distribution channels, a DC busbar, and a three phase inverter,
- a first half-panel that brings together first technical busbars of the second electrical distribution channels at 115 volts AC, and first commercial busbars of the second electrical distribution channels,
- a second half-panel that brings together second technical busbars of the second electrical distribution channels at 115 volts AC and second commercial busbars of the second electrical distribution channels,
- a third half-panel that brings together busbars, power converters, and a transformer rectifier, and
- a fourth half-panel that brings together busbars, power converters, and a transformer rectifier.

27. The system according to claim 21, further comprising intermittent power actuators supplied with power by a battery that supplies power for high but brief intermittent power demand peaks.

28. The system according to claim 1, wherein the aircraft is an aeroplane.

29. An aircraft comprising the system according to claim 1.

* * * * *